United States Patent
Liu et al.

(10) Patent No.: US 9,516,328 B2
(45) Date of Patent: Dec. 6, 2016

(54) METHOD AND APPARATUS FOR RATE CONTROL ACCURACY IN VIDEO ENCODING

(75) Inventors: Yali Liu, Pleasanton, CA (US); Qian Xu, Plainsboro, NJ (US); Xiaoan Lu, Princeton, NJ (US); Cristina Gomila, Princeton, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 486 days.

(21) Appl. No.: 12/735,441

(22) PCT Filed: Jan. 15, 2009

(86) PCT No.: PCT/US2009/000225
§ 371 (c)(1),
(2), (4) Date: Nov. 4, 2010

(87) PCT Pub. No.: WO2009/091548
PCT Pub. Date: Jul. 23, 2009

(65) Prior Publication Data
US 2011/0051807 A1    Mar. 3, 2011

Related U.S. Application Data

(60) Provisional application No. 61/021,687, filed on Jan. 17, 2008.

(51) Int. Cl.
*H04N 7/26* (2006.01)
*H04N 19/192* (2014.01)
*H04N 19/176* (2014.01)
*H04N 19/172* (2014.01)
(Continued)

(52) U.S. Cl.
CPC .......... *H04N 19/192* (2014.11); *H04N 19/124* (2014.11); *H04N 19/149* (2014.11); *H04N 19/172* (2014.11); *H04N 19/176* (2014.11); *H04N 19/61* (2014.11)

(58) Field of Classification Search
USPC .................................................. 375/240.03
See application file for complete search history.

(56) References Cited

U.S. PATENT DOCUMENTS 6,351,226 B1  2/2002  Saunders et al.
6,668,088 B1  12/2003  Werner et al.
(Continued)

FOREIGN PATENT DOCUMENTS

GB    GB2352906     2/2001
JP    2001069511    3/2001
(Continued)

OTHER PUBLICATIONS

Wedi, T.; Wittmann, S.; , "Quantization offsets for video coding," IEEE 2005.*
(Continued)

*Primary Examiner* — Mohammed Rahaman
(74) *Attorney, Agent, or Firm* — Tutunjian & Bitetto, P.C.

(57) ABSTRACT

A method and apparatus are provided for rate control accuracy in video encoding. The apparatus includes a video encoder for encoding image data in a single encoding pass using rate control. The rate control involves defining a quantization step size value and a rounding offset value and refining at least the rounding offset value. The image data is encoded responsive to the quantization step size value and the refined rounding offset value.

12 Claims, 3 Drawing Sheets

(51) Int. Cl.
  *H04N 19/149* (2014.01)
  *H04N 19/61* (2014.01)
  *H04N 19/124* (2014.01)

(56) References Cited

U.S. PATENT DOCUMENTS

| | | | |
|---|---|---|---|
| 7,346,106 B1 * | 3/2008 | Jiang et al. | 375/240.12 |
| 8,009,730 B2 | 8/2011 | Zhu et al. | |
| 2004/0151245 A1 * | 8/2004 | Lainema et al. | 375/240.03 |
| 2005/0031034 A1 * | 2/2005 | Kamaci | H04N 19/176 375/240.03 |
| 2005/0180502 A1 * | 8/2005 | Puri | 375/240.03 |
| 2006/0098733 A1 * | 5/2006 | Matsumura et al. | 375/240.03 |
| 2007/0025441 A1 * | 2/2007 | Ugur | H04N 19/159 375/240.03 |
| 2010/0232498 A1 | 9/2010 | Liu et al. | |

FOREIGN PATENT DOCUMENTS

| | | |
|---|---|---|
| JP | 2001518247 | 10/2001 |
| JP | 2002152734 | 5/2002 |
| JP | 2006067302 | 3/2006 |
| JP | 2006157881 | 6/2006 |
| JP | 2006333444 | 12/2006 |
| JP | 2010541469 | 12/2010 |
| WO | WO98/38800 | 9/1998 |

OTHER PUBLICATIONS

He et al., "A Linear Source Model and a Unified Rate Control Algorithm for DCT Video Coding", IEEE Transactions on Circuits and Systems for Video Technology, vol. 12, No. 11, Nov. 2002.

Xu et al., "A New Source Model and Accurate Rate Control Algorithm with QP and Rounding Offset Adaptation", Image Processing 2008, 15th IEEE International Conference, Piscataway, NJ, pp. 2496-2499, Oct. 12, 2008.

Liu et al., "A Novel Fine Rate Control Algorithm with Adaptive Rounding Offset", Circuits and Systems 2008, IEEE International Symposium, Piscataway, NJ, pp. 3490-3493, May 18, 2008.

Itu-T, "Advanced Video Coding for Generic Audiovisual Services", International Telecommuncation Union, H.264, Mar. 2005.

He et al., "Linear Rate Control for JVT Video Coding", Sarnoff Corporation, Princeton, New Jersey, 2003 IEEE, pp. 65-68.

He et al., "Optimum Bit Allocation and Accurate Rate Control for Video Coding via p-Domain Source Modeling", IEEE Transactions on Circuits and Systems for Video Technology, vol. 12, No. 10, Oct. 2002, pp. 840-849.

Ribas-Corbera et al., Rate Control in DCT Video Coding for Low-Delay Communications, IEEE Transactions on Circuits and Systems for Video Technology, vol. 9, No. 1, Feb. 1999, pp. 172-185.

International Search Report Dated May 8, 2009.

* cited by examiner

METHOD AND APPARATUS FOR RATE CONTROL ACCURACY IN VIDEO ENCODING

CROSS-REFERENCE TO RELATED APPLICATIONS

This application claims the benefit, under 35 U.S.C. §365 of International Application PCT/US2009/000225, filed Jan. 15, 2009, which was published in accordance with PCT Article 21(2) on Jul. 23, 2009, in English, and which claims the benefit of U.S. Provisional Patent Application No. 61/021,687, filed Jan. 17, 2008, in English.

TECHNICAL FIELD

The present principles relate generally to video encoding and, more particularly, to a method and apparatus for rate control accuracy in video encoding.

BACKGROUND

Most video coding applications constrain the encoder to compress the input video at a given target bit rate. To accomplish the same, the encoder uses a rate control system. A rate control system allocates a number of bits to each picture in the input video source and adjusts encoding parameters to match the allocated number of bits. The performance of a rate control system is measured by the accuracy in meeting the target bit rate and the visual quality of the compressed video. For example, in video coding standards such as the International Organization for Standardization/International Electrotechnical Commission (ISO/IEC) Moving Picture Experts Group-2 (MPEG-2) Standard, the ISO/IEC Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard"), and the Society of Motion Picture and Television Engineers (SMPTE) Video Codec-1 Standard (hereinafter the "VC-1 Standard"), several quantization parameters, such as the quantization step size, the rounding offset, and the quantization matrix, are capable of influencing the bit rate.

An example of a video quantization process in accordance with the MPEG-4 AVC Standard will now be described. Mathematically, in the encoder, the transformed coefficients are quantized as follows:

$$Z = \left\lfloor \frac{|W|}{q} + s \right\rfloor \cdot \text{sgn}(W), \quad (1)$$

where W denotes the transformed coefficient, Z denotes a quantization level to which the transformed coefficient is quantized to, q denotes the quantization step size, and s denotes the rounding offset. The function $\lfloor \cdot \rfloor$ rounds a value to the nearest integer, and the function sgn(.) returns the sign of a signal. When the quantization matrix is applied, the coefficients are scaled first before the quantization process at the encoder. The range of W where it is quantized to 0 is called the deadzone. In this particular case, the deadzone is $\Delta = 2 \times (1-s) \times q$. At the decoder, the quantization level Z is reconstructed to the signal W'. This is called inverse quantization and is described mathematically as follows:

$$W' = q \cdot Z. \quad (2)$$

A rate control algorithm mainly adjusts the quantization parameters to obtain the target number of bits. The rate control is considered to be accurate when the number of bits used for some time interval is close or equal to the allocated number of bits for this time interval. The specific time interval used to measure the rate control accuracy is defined depending on the application. In some applications, the bit rate is preferred to be accurate on a picture level. In other applications such as broadcast, the bit rate should be accurate over a few frames due to the channel bandwidth constraint. Moreover, in some other applications such as digital video disk (DVD) authoring, the bit rate accuracy is often measured for the entire sequence and is considered accurate when the number of bits consumed by the entire movie meets the requirement.

Existing rate control algorithms usually assume the rounding offset and quantization matrix are constant and they only adjust the quantization step size. The quantization step sizes have only a finite number of choices. They are represented by quantization indices, which are embedded in the encoded bitstream and conveyed to the decoder for reconstructing the video. With a limited number of quantization step sizes to choose from, existing rate control algorithms can hardly achieve very accurate control without loss of quality. Loss of quality due to the rate control algorithm is often seen as quality inconsistence within the picture or across the pictures. Pictures with lower quality may include visible artifacts that cause part of the picture to be displayed distorted.

To improve the rate control accuracy for a picture, a common approach in existing algorithms is to apply macroblock-level (MB-level) rate control. In accordance with the prior art, a ρ-domain rate control method has been used. A ρ-domain rate control method assumes a linear relation between ρ and R, where ρ denotes the percentage of zero coefficients among the quantized transformed coefficients for an encoded region, and R denotes the number of bits used for encoding the region. Mathematically, a linear rate model is represented as follows:

$$R(\rho) = \theta(1-\rho) + R_c, \quad (3)$$

where $R_c$ denotes the number of non-texture bits used for encoding a region, and θ denotes a constant.

Note that ρ monotonically increases with the quantization step size q, which implies that there is a one-to-one mapping between them. Therefore, given the target number of bits R, the estimated parameters θ and $R_c$, a ρ-domain rate control method obtains the value of ρ and, therefore, the quantization step size q, based on the one-to-one ρ-q mapping.

Often the quantization step size q calculated above may not fall into the limited number of quantization step sizes that can be represented by quantization indices in the encoder. One approach is to let the macroblocks within the picture use quantization step sizes around q', the quantization step size that is closest to q and can be represented by a quantization index. Moreover, the average quantization step size used by the picture is approximately q. In one embodiment, a macroblock can choose from among several quantization step sizes {q'-$\Delta_1$, q', q'+$\Delta_2$}. Another approach is to update θ and $R_c$ after each macroblock is encoded, and calculate q for each macroblock.

Yet another popular rate control algorithm is the TMN8 rate control algorithm. In the TMN8 rate control algorithm, a quantization step size q is first calculated for a picture. The encoder starts encoding macroblocks with q. Then, as more macroblocks are encoded, the rate control model parameters are updated and the quantization step size is updated on a macroblock basis.

One problem with the macroblock-level adjustment is that the quantization step sizes vary among macroblocks. In some cases, the difference between the quantization parameters can cause inconsistent quality within the picture.

Turning to FIG. 1, a method for rate control for video encoding is indicated generally by the reference numeral 100.

The method 100 includes a start block 105 that passes control to a function block 110. The function block 110 performs and/or otherwise involves an encoding setup, and passes control to a function block 115. The function block 115 initializes rate control parameters, and passes control to a loop limit block 120. The loop limit block 120 performs a loop over each macroblock in a current picture being processed, using a variable i, where i=1, . . . , number (#) of macroblocks in the picture, and passes control to a function block 125. The function block 125 calculates the quantization step size $q_i$ for macroblock i, and passes control to a function block 130. The function block 130 encodes macroblock i at quantization step size $q_i$, and passes control to a function block 135. The function block 135 updates the rate control model parameters (for example, based on previously encoded macroblocks), and passes control to a loop limit block 140. The loop limit block ends the loop, and passes control to an end block 199.

Hence, the encoding process ends after all macroblocks in the picture are encoded. It is to be appreciated that method 100 of FIG. 1, the rounding offset parameter is constant throughout the encoding process to which applies method 100. It is to be further appreciated that function block 110 may optionally involve the aid of an operator. Moreover, the encoder setup corresponding to function block 110 may involve the setup of the target bit rate as well as the specification of any set of parameters involved in the encoding process.

The quantization step sizes used by all macroblocks, $\{q_i\}_{i=1, \ldots, \# \, of \, MBs}$ may vary significantly and cause quality inconsistence within the picture. To obtain more consistent quality in the picture, the encoder can choose to limit the dynamic range of the quantization step size. As a result, the number of bits that a picture spends may differ significantly from the target one.

SUMMARY

These and other drawbacks and disadvantages of the prior art are addressed by the present principles, which are directed to a method and apparatus for rate control accuracy in video encoding.

According to an aspect of the present principles, there is provided an apparatus. The apparatus includes a video encoder for encoding image data in a single encoding pass using rate control. The rate control involves defining a quantization step size value and a rounding offset value and refining at least the rounding offset value. The image data is encoded responsive to the quantization step size value and the refined rounding offset value.

According to another aspect of the present principles, there is provided a method. The method includes encoding image data in a single encoding pass using rate control. The rate control involves defining a quantization step size value and a rounding offset value and refining at least the rounding offset value. The image data is encoded responsive to the quantization step size value and the refined rounding offset value.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
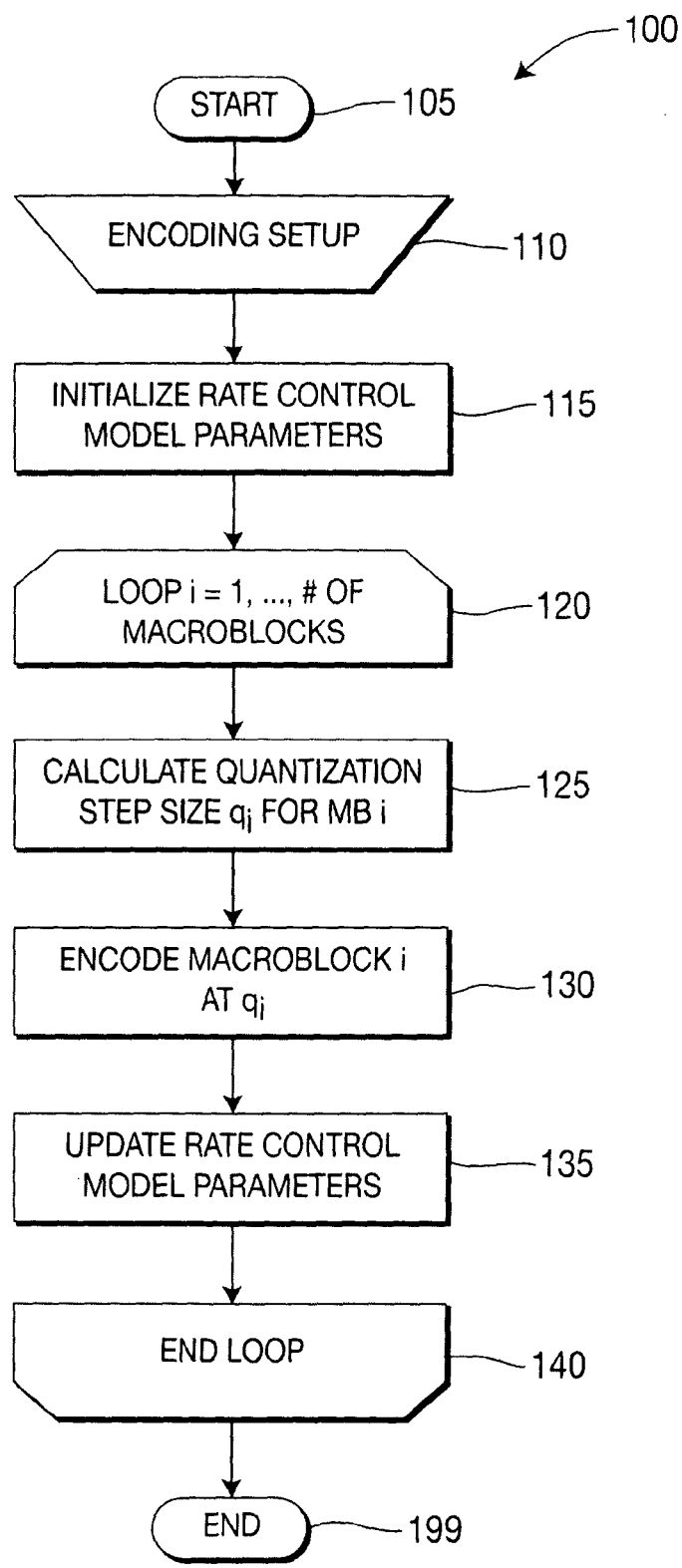
FIG. 1 is a flow diagram for a rate control method in a video encoder, in accordance with the prior art.

The present principles are directed to a method and apparatus for rate control accuracy in video encoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, in the description provided herein, the MPEG-4 AVC Standard is used to provide an example of a video coding quantization process, as well as to illustrate one or more embodiments of the present principles. However, it would be apparent to those or ordinary skill in this and related arts that other standards, recommendations, and extensions thereof, including, but not limited to, the ITU-T H.263 Recommendation (hereinafter the "H.263 Recommendation"), and the MPEG-2 Standard follow similar quantization procedures and, thus, the present principles as set forth herein are not limited to the MPEG-4 AVC Standard use for illustration, or any other particular video coding standard, recommendation, and/or extension thereof.

As noted above, the present principles are directed to a method and apparatus for rate control accuracy in video encoding.

Figure 2:
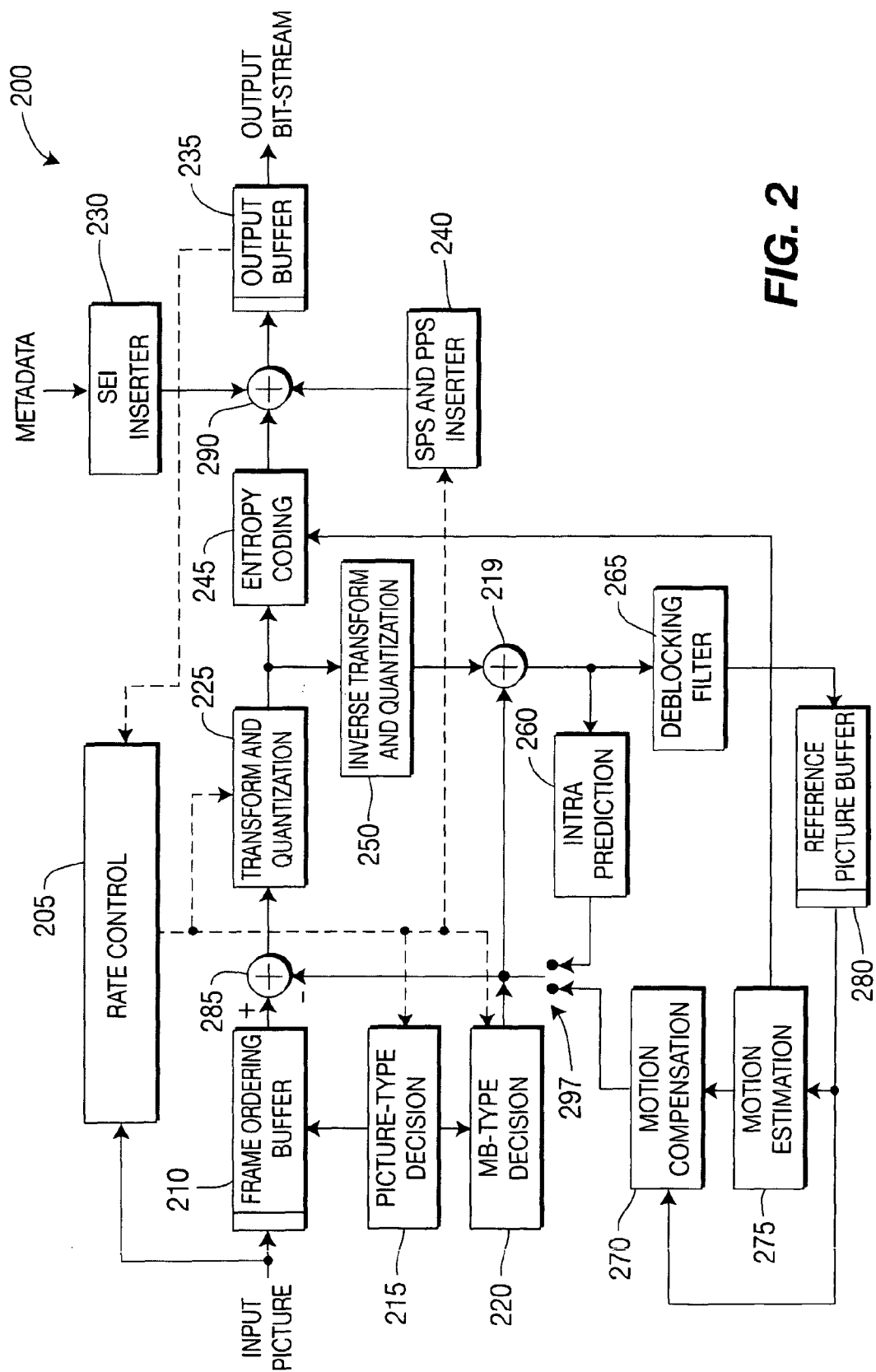
FIG. 2 is a block diagram for an exemplary video encoder to which the present principles may be applied, in accordance with an embodiment of the present principles.

Turning to FIG. 2, an exemplary video encoder to which the present principles may be applied is indicated generally by the reference numeral 200.

The video encoder 200 includes a frame ordering buffer 210 having an output in signal communication with a non-inverting input of a combiner 285. An output of the combiner 285 is connected in signal communication with a first input of a transformer and quantizer 225. An output of the transformer and quantizer 225 is connected in signal communication with a first input of an entropy coder 245 and an input of an inverse transformer and inverse quantizer 250. An output of the entropy coder 245 is connected in signal communication with a first non-inverting input of a combiner 290. An output of the combiner 290 is connected in signal communication with a first input of an output buffer 235.

An output of a rate controller 205 is connected in signal communication with an input of a picture-type decision module 215, a first input of a macroblock-type (MB-type) decision module 220, a second input of the transformer and quantizer 225, and an input of a Sequence Parameter Set (SPS) and Picture Parameter Set (PPS) inserter 240. A second output of the output buffer 235 is connected in signal communication with an input of the rate controller 205.

An output of the SEI inserter 230 is connected in signal communication with a second non-inverting input of the combiner 290.

A first output of the picture-type decision module 215 is connected in signal communication with a second input of a frame ordering buffer 210. A second output of the picture-type decision module 215 is connected in signal communication with a second input of a macroblock-type decision module 220.

An output of the Sequence Parameter Set (SPS) and Picture Parameter Set (PPS) inserter 240 is connected in signal communication with a third non-inverting input of the combiner 290.

An output of the inverse quantizer and inverse transformer 250 is connected in signal communication with a first non-inverting input of a combiner 219. An output of the combiner 219 is connected in signal communication with an input of the intra prediction module 260 and an input of the deblocking filter 265. An output of the deblocking filter 265 is connected in signal communication with an input of a reference picture buffer 280. An output of the reference picture buffer 280 is connected in signal communication with an input of the motion estimator 275 and with a first input of the motion compensator 270. A first output of the motion estimator 275 is connected in signal communication with a second input of the motion compensator 270. A second output of the motion estimator 275 is connected in signal communication with a third input of the entropy coder 245.

An output of the motion compensator 270 is connected in signal communication with a first input of a switch 297. An output of the intra prediction module 260 is connected in signal communication with a second input of the switch 297. An output of the macroblock-type decision module 220 is connected in signal communication with a third input of the switch 297. The third input of the switch 297 determines whether or not the "data" input of the switch (as compared to the control input, i.e., the third input) is to be provided by the motion compensator 270 or the intra prediction module 260. The output of the switch 297 is connected in signal communication with a second non-inverting input of the combiner 219 and with an inverting input of the combiner 285.

An input of the frame ordering buffer 210 is available as input of the encoder 200, for receiving an input picture. Moreover, an input of the Supplemental Enhancement Information (SEI) inserter 230 is available as an input of the encoder 200, for receiving metadata. A first output of the output buffer 235 is available as an output of the encoder 200, for outputting a bitstream.

As noted above, existing rate control methods either lack rate control accuracy or create quality inconsistencies. In accordance with the present principles, we introduce another parameter or metric, which we call the rounding offset, into the rate control algorithm. By including this rounding offset, we achieve very accurate rate control for each picture with homogeneous quality within the picture. When the present principles are applied to other applications where the bit rate accuracy is measured in longer intervals than a picture, the present principles can easily achieve accurate rate control.

In an embodiment, the present principles are directed to addressing the problem of designing an accurate rate control algorithm on a picture level in a video encoder with little computation overhead. Existing rate control algorithms mainly rely on the adjustment of the quantization step size parameter in order to control the bit rate accuracy. However, in video coding standards such as the MPEG-2 Standard, the MPEG-4 AVC Standard, and the VC-1 Standard, there are other encoding parameters that also influence the bit rate. In particular, in an embodiment, we provide a method that utilizes the rounding offset to improve the bit rate control accuracy and runs in a single pass. When a rate control algorithm obtains bit rate accuracy on a picture level in accordance with the present principles, the rate control algorithm can easily achieve such bit rate accuracy for longer time intervals.

In an embodiment, we propose to include another quantization parameter, namely the rounding offset s, to improve the rate control accuracy on a picture level. Both the quantization step size and the rounding offset affect the number of bits, R, used by the encoder. This can be described mathematically as follows:

$$R(q,s)=f(q,s), \quad (4)$$

where the function $f(.)$ describes how the quantization step size and the rounding offset affect the number of bits. One example of the function is as follows:

$$\ln(R(q,s))=k_s \times s + k_q \times q + c, \quad (5)$$

where $k_s$, $k_q$ and c are constants.

Figure 3:
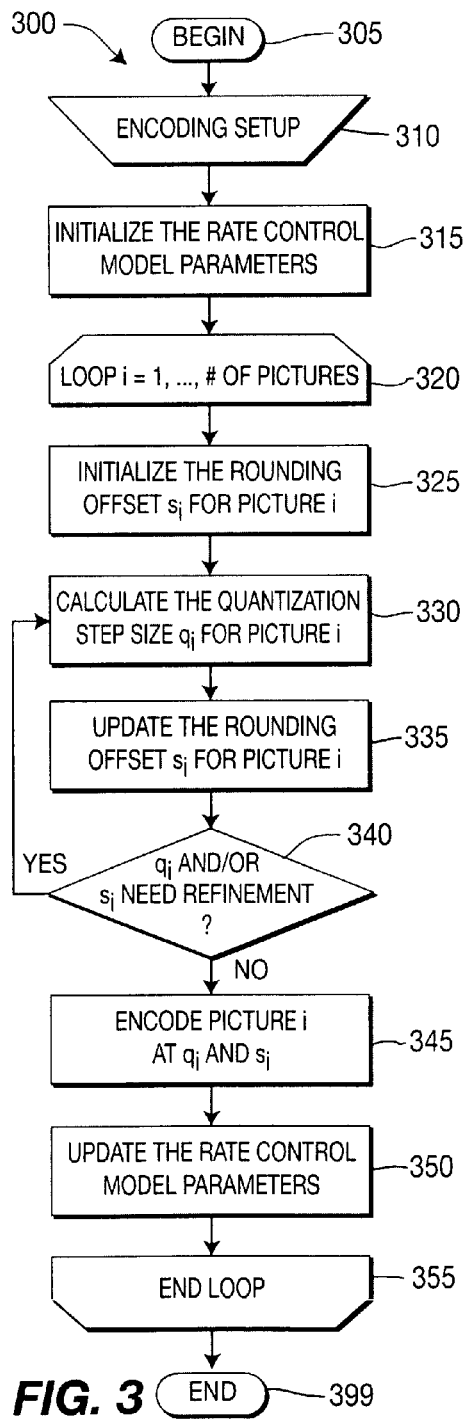
FIG. 3 is a flow diagram for an exemplary rate control method in a single-pass video encoder, the method including a non-constant rounding offset, in accordance with an embodiment of the present principles.
Figure 4:
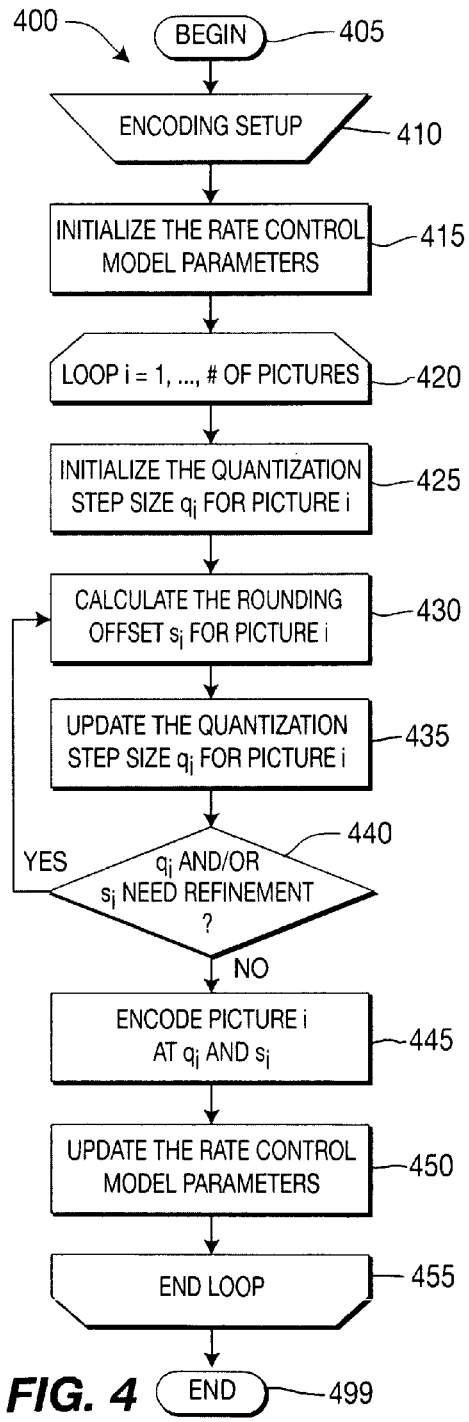
FIG. 4 is a flow diagram for another exemplary rate control method in a single-pass video encoder, the method including a non-constant rounding offset, in accordance with an embodiment of the present principles.

FIGS. 3 and 4 illustrate exemplary embodiments that include the rounding offset, in addition to the quantization step size, in a rate control algorithm. It is to be appreciated that depending on the way the number of bits is allocated, illustrated embodiments could serve a variable-bit-rate (VBR) or constant-bit-rate (CBR) application. Moreover, it is to be further appreciated that the present principles can be implemented as part of a multi-pass encoder and can be configured to provide information for other passes.

Embodiment 1

An embodiment of a rate control method for a single pass video encoder will initially be described generally, and then further described with respect to FIG. 3.

According to the embodiment, the encoder first selects an initial rounding offset s and calculates the quantization step size q based on the initial s. Existing rate control algorithms that adjust q to meet the target bit rate can be used including, but not limited to, TM5, TMN8, ρ-domain rate control algorithms, and so forth. Using the obtained quantization step size q and the model of R(q,s), we calculate the rounding offset s to better meet the target bit rate.

After q and s are calculated, we identify whether further refinement is necessary. In one embodiment, we judge if s has been outside of a pre-determined range that guarantees consistent visual quality between adjacent pictures. We repeat the process of updating q and s until the refinement is not necessary or the constraint imposed on the computation is met.

The quantization step size q and the rounding offset s that no longer require refinement are used for encoding. After the encoding is completed, we update the rate control parameters. When there are multiple pictures to be encoded, all the information from some or all of the pictures can be used to update the rate control model parameters.

Turning to FIG. 3, an exemplary rate control method in a single pass video encoder, where the method includes a non-constant rounding offset, is indicated generally by the reference numeral 300.

The method 300 includes a start block 305 that passes control to a function block 310. The function block 310 performs and/or otherwise involves an encoding setup, and passes control to a function block 315. The function block 315 initializes rate control model parameters, and passes control to a loop limit block 320. The loop limit block 320 performs a loop over each picture in a current video sequence being processed, using a variable i, where i=1, . . . , number (#) of pictures, and passes control to a function block 325. The function block 325 initializes the rounding offset $s_i$ for picture i, and passes control to a function block 330. The function block 330 calculates the quantization step size $q_i$ for picture i, and passes control to a function block 335. The function block 335 updates the rounding offset $s_i$ for picture i, and passes control to a decision block 340. The decision block 340 determines whether or not $q_i$ and/or $s_i$ need refinement. If so, then control is returned to the function block 330. Otherwise, control is passed to a function block 345.

The function block 345 encodes the picture i at $q_i$ and $s_i$, and passes control to a function block 350. The function block 350 updates the rate control model parameters, and passes control to a loop limit block 355. The loop limit block 355 ends the loop, and passes control to an end block 399.

With respect to function block 315, the rounding offset may be initialized, for example, to 1/3.0 and 1/6.0 for an INTRA and INTER picture, respectively. With respect to decision block 340 and its determination as to whether the quantization step size q and/or the rounding offset s need refinement, when further refinement is needed the processes corresponding to function blocks 330 and 335 are repeated to obtain more accurate values of q and s.

The advantage of this method over the typical rate control method described with respect to FIG. 1 is that all macroblocks in a picture are encoded at the same quantization step sizes and rounding offsets and, thus, the quality of all macroblocks are consistent. This method also runs at a computation complexity that is very close to the method described with respect to FIG. 1.

Embodiment 2

FIG. 4 illustrates a variation of the method described with respect to FIG. 3. In the method of FIG. 4, we first initialize the quantization step size for the picture. As a particular embodiment, we can initialize the quantization step size to be the one from the immediately preceding picture of the same picture type. Then the rounding offset is calculated given the quantization step size. We update the quantization step size.

Turning to FIG. 4, an exemplary rate control method in a video encoder, where the method includes a non-constant rounding offset, is indicated generally by the reference numeral 400.

The method 400 includes a start block 405 that passes control to a function block 410. The function block 410 performs and/or otherwise involves an encoding setup, and passes control to a function block 415. The function block 415 initializes rate control model parameters, and passes control to a loop limit block 420. The loop limit block 420 performs a loop over each picture in a current video sequence being processed, using a variable i, where i=1, . . . , number (#) of pictures, and passes control to a function block 425. The function block 425 initializes the quantization step size $q_i$ for picture i, and passes control to a function block 430. The function block 430 calculates the rounding offset $s_i$ for picture i, and passes control to a function block 435. The function block 435 updates the quantization step size $q_i$ for picture i, and passes control to a decision block 440. The decision block 440 determines whether or not $q_i$ and/or $s_i$ need refinement. If so, then control is returned to the function block 430. Otherwise, control is passed to a function block 445.

The function block 445 encodes the picture i at $q_i$ and $s_i$ and passes control to a function block 450. The function block 450 updates the rate control model parameters, and passes control to a loop limit block 455. The loop limit block 455 ends the loop, and passes control to an end block 499.

A description will now be given of some of the many attendant advantages/features of the present invention, some of which have been mentioned above. For example, one advantage/feature is an apparatus having a video encoder for encoding image data in a single encoding pass using rate control. The rate control involves defining a quantization step size value and a rounding offset value and refining at least the rounding offset value. The image data is encoded responsive to the quantization step size value and the refined rounding offset value.

Another advantage/feature is the apparatus having the encoder as described above, wherein the rate control further involves refining the quantization step size value, and wherein the image data is encoded responsive to the refined quantization step size value and the refined rounding offset value.

Yet another advantage/feature is the apparatus having the encoder as described above, wherein at least one of the quantization step size value and the rounding offset value is defined initially as an estimate.

Still another advantage/feature is the apparatus having the encoder wherein at least one of the quantization step size value and the rounding offset value is defined initially as an estimate as described above, wherein the other one of the quantization step size value and the rounding offset value is defined based on the estimate.

Moreover, another advantage/feature is the apparatus having the encoder wherein at least one of the quantization step size value and the rounding offset value is defined initially as an estimate as described above, wherein the rounding offset value is defined initially as the estimate, and wherein the estimate is based on a linear relationship between a target bit rate for the rate control and the rounding offset.

Further, another advantage/feature is the apparatus having the encoder as described above, wherein the rate control is applied to at least one of a constant-bit-rate application and a variable-bit-rate application.

Also, another advantage/feature is the apparatus having the encoder as described above, wherein the video encoder encodes the image data in a resultant bitstream compliant with the International Organization for Standardization/International Electrotechnical Commission Moving Picture Experts Group-4 Part 10 Advanced Video Coding Standard/International Telecommunication Union, Telecommunication Sector H.264 Recommendation.

Additionally, another advantage/feature is the apparatus having the encoder as described above, wherein rate control parameters for the rate control are based on at least one of a ρ-domain rate model, a TM5 rate model, and a TMN8 rate model.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:
1. An apparatus, comprising:
 a video encoder for encoding image data for a picture in a single encoding pass using rate control, wherein the rate control involves defining a quantization step size value and a rounding offset value and refining the quantization step size value and the rounding offset value, wherein the quantization step size value and the rounding offset value are refined by initially defining at least one of the quantization step size value and the rounding offset value as an estimate, and the other one of the quantization step size value and the rounding offset value is defined based on the estimate, and wherein the estimate is based on modeling a target number of bits for the picture and wherein the image data for the picture is encoded responsive to the refined quantization step size value and the refined rounding offset value, and wherein the quantization step size value and the rounding offset value are refined based on a judgement of whether the rounding offset is outside a predetermined range that guarantees consistent visual quality between temporally adjacent pictures.

2. The apparatus of claim 1, wherein the rate control further involves refining the quantization step size value, and wherein the image data is encoded responsive to the refined quantization step size value and the refined rounding offset value.

3. The apparatus of claim 1, wherein the rounding offset value is defined initially as the estimate, and wherein the estimate is based on a linear relationship between a target bit rate for the rate control and the rounding offset.

4. The apparatus of claim 1, wherein the rate control is applied to at least one of a constant-bit-rate application and a variable-bit-rate application.

5. The apparatus of claim 1, wherein said video encoder encodes the image data in a resultant bitstream compliant with the International Organization for Standardization/International Electrotechnical Commission Moving Picture Experts Group-4 Part 10 Advanced Video Coding Standard/International Telecommunication Union, Telecommunication Sector H.264 Recommendation.

6. The apparatus of claim 1, wherein rate control parameters for the rate control are based on at least one of a ρ-domain rate model, a TM5 rate model, and a TMN8 rate model.

7. A method, comprising:
encoding image data for a picture in a single encoding pass using rate control, wherein the rate control involves defining a quantization step size value and a rounding offset value and refining the quantization step size value and the rounding offset value, wherein the quantization step size value and the rounding offset value are refined by initially defining at least one of the quantization step size and the rounding offset value as an estimate, and the other one of the quantization step size value and the rounding offset value is defined based on the estimate, and wherein the estimate is based on modeling a target number of bits for the picture and wherein the image data for the picture is encoded responsive to the refined quantization step size value and the refined rounding offset value, and wherein the quantization step size value and the rounding offset value are refined based on a judgement of whether the rounding offset is outside a predetermined range that guarantees consistent visual quality between temporally adjacent pictures.

8. The method of claim 7, wherein the rate control further involves refining the quantization step size value, and wherein the image data is encoded responsive to the refined quantization step size value and the refined rounding offset value.

9. The method of claim 7, wherein the rounding offset value is defined initially as the estimate, and wherein the estimate is based on a linear relationship between a target bit rate for the rate control and the rounding offset.

10. The method of claim 7, wherein the rate control is applied to at least one of a constant-bit-rate application and a variable-bit-rate application.

11. The method of claim 7, wherein said encoding step encodes the image data in a resultant bitstream compliant with the International Organization for Standardization/International Electrotechnical Commission Moving Picture Experts Group-4 Part 10 Advanced Video Coding Standard/International Telecommunication Union, Telecommunication Sector H.264 Recommendation.

12. The method of claim 7, wherein rate control parameters for the rate control are based on at least one of a ρ-domain rate model, a TM5 rate model, and a TMN8 rate model.

* * * * *